(12) United States Patent
Konrad et al.

(10) Patent No.: US 9,503,620 B2
(45) Date of Patent: Nov. 22, 2016

(54) EVALUATION OF THE SECURITY SITUATION IN A BUILDING BY MEANS OF A RADIO TOMOGRAPHIC LOCATION AND DETECTION METHOD AND BY MEANS OF RFID READING DEVICES

(75) Inventors: Hilmar Konrad, Baar (CH); Dieter Wieser, Küsnacht (CH)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 152 days.

(21) Appl. No.: 14/342,424

(22) PCT Filed: Sep. 30, 2011

(86) PCT No.: PCT/EP2011/067197
§ 371 (c)(1),
(2), (4) Date: Apr. 18, 2014

(87) PCT Pub. No.: WO2013/029693
PCT Pub. Date: Mar. 7, 2013

(65) Prior Publication Data
US 2014/0375454 A1 Dec. 25, 2014

(30) Foreign Application Priority Data
Sep. 1, 2011 (EP) .................................... 11179781

(51) Int. Cl.
*G08B 13/18* (2006.01)
*H04N 5/225* (2006.01)
(Continued)

(52) U.S. Cl.
CPC ........ *H04N 5/2252* (2013.01); *G06K 7/10366* (2013.01); *G08B 13/24* (2013.01);
(Continued)

(58) Field of Classification Search
CPC ................ G06K 7/10366; G08B 13/24; G08B 13/248; G08B 13/2491; H04N 5/33; H04N 7/18
(Continued)

(56) References Cited

U.S. PATENT DOCUMENTS 3,163,861 A * 12/1964 Suter .................. G08B 13/2491
315/185 S
7,466,224 B2 * 12/2008 Ward .................. G07C 9/00111
340/5.2
(Continued)

FOREIGN PATENT DOCUMENTS

JP 2009014646 1/2009
WO 2004068432 A1 8/2004

OTHER PUBLICATIONS

Balzano, et al., Measurement of equivalent power density and RF energy deposition in the immediate vicinity of a 24-GHz traffic radar antenna, May 1995, Electromagnetic Compatibility, IEEE Transactions (vol. 37, Issue: 2).*
(Continued)

*Primary Examiner* — Eric M Blount
(74) *Attorney, Agent, or Firm* — Laurence Greenberg; Werner Stemer; Ralph Locher

(57) ABSTRACT

A method and a system evaluate a security situation in a building. The building has accommodation areas with access authorization for authorized persons. A count of the persons present in the accommodation areas is determined in that, in a radio network which contains a plurality of radio stations arranged spatially distributed in the ceiling, wall or floor, the influencing of the radio field of the radio stations between one another by persons physically present there is evaluated, by a radio tomographic location and detection method. A current count of identifiers which are read by RFID reading devices of RFID transponders is determined, the identifiers being carried by authorized persons. The RFID reading devices are arranged there spatially distributed in the ceiling, wall or floor. Based on the respective counts of personal identifiers and the determined person count, an indicator for evaluating the current security situation in the building is determined.

18 Claims, 4 Drawing Sheets

(51) Int. Cl.
*G08B 13/24* (2006.01)
*G06K 7/10* (2006.01)
*H04N 5/33* (2006.01)
*H04N 7/18* (2006.01)

(52) U.S. Cl.
CPC ......... *G08B 13/248* (2013.01); *G08B 13/2491* (2013.01); *H04N 5/33* (2013.01); *H04N 7/18* (2013.01)

(58) Field of Classification Search
USPC ........................................................ 340/552
See application file for complete search history.

(56) References Cited

U.S. PATENT DOCUMENTS

| | | | | |
|---|---|---|---|---|
| 7,541,968 B2* | 6/2009 | Hall | ........................ | G01S 7/282 342/118 |
| 8,102,238 B2* | 1/2012 | Golander | ............ | G07C 9/00111 235/375 |
| 8,138,918 B2* | 3/2012 | Habib | ................ | G08B 13/2491 340/286.02 |
| 8,836,344 B2* | 9/2014 | Habib | ................... | G01S 5/0289 324/616 |
| 8,866,663 B2* | 10/2014 | Aharony | ................ | G01S 13/04 342/107 |
| 2002/0027896 A1* | 3/2002 | Hughes | ................... | H04L 45/00 370/342 |
| 2003/0076230 A1* | 4/2003 | Runyon | ............. | G08B 21/0227 340/572.1 |
| 2003/0197612 A1* | 10/2003 | Tanaka | ................... | G06K 17/00 340/572.1 |
| 2005/0055568 A1* | 3/2005 | Agrawala | ........... | G07C 9/00111 726/2 |
| 2006/0217132 A1* | 9/2006 | Drummond-Murray | | H04W 64/00 455/456.2 |
| 2008/0007404 A1* | 1/2008 | Albert | ................... | G01S 5/0252 340/552 |
| 2011/0075635 A1 | 3/2011 | Ryu et al. | | |
| 2011/0195701 A1 | 8/2011 | Cook et al. | | |

OTHER PUBLICATIONS

Rifevideos.com, Absorption of RF Radiation, http://www.rifevideos.com/absorption_of_rf_radiation.html, Jan. 1997.*

* cited by examiner

EVALUATION OF THE SECURITY SITUATION IN A BUILDING BY MEANS OF A RADIO TOMOGRAPHIC LOCATION AND DETECTION METHOD AND BY MEANS OF RFID READING DEVICES

BACKGROUND OF THE INVENTION

Field of the Invention

The invention relates to a method for evaluating the security situation in a building, the building having accommodation areas with access authorization for authorized persons, such as offices, research and development departments, connecting areas such as halls, corridors, stairways and elevators as well as entrances and exits. A building of this type can have a plurality of floors with accommodation areas in need of monitoring. The invention further relates to suitable applications of the method according to the invention.

Methods and systems for building security are generally known from the prior art wherein the presence of persons is detected, for example, by means of movement sensors or by means of cameras with downstream image processing.

A location and detection principle based on the influencing of radio fields by the presence of human bodies is known, for example, from a contribution to the 12th Wireless Technologies Congress, "From Technology to Application" on 22-23 Sep. 2010 in Bochum with the title "Funk-basierte Monitoring-Systeme zur Raumüberwachung" (Radio-Based Monitoring Systems for Room Monitoring) by Professor Stefan Witte et al., Lemgo, Germany, published in written form in "Reihen der Fortschritte-Berichte VDI", ISBN 978-3-18-381010-9, pages 190 to 198. The radio stations used there are WLAN radio stations which are operated in the frequency range around 2.45 GHz. It is precisely this frequency that is used for heating water-containing foods in a microwave oven, since this frequency is absorbed particularly well by water. Since the human body also consists largely of water, here also a significant absorption, particularly of radio waves in this frequency region takes place. This absorption thus causes attenuation which is detectable on the receiving side at a further WLAN station lying in the radio shadow, as a reduction of the received field strength or of the receiving level. A method of this type is also designated variance-based radio tomography or Radio Tomographic Imaging (RTI).

In the publication "Radio Tomographic Imaging with Wireless Networks" by Joey Wilson and Neal Patwari, University of Utah, published in Tech Report on 16 Sep. 2008, the method and the structure of a network of this type is described in detail.

Also disclosed by DE 10 2007 001 225 A1 is a sensitive floor which has a plurality of surface covering elements laid in a grid pattern, each having a plurality of sensor surfaces. The sensor surfaces are sensitive to pressure and simultaneously sensitive to the presence of an electrically polarizable body, for example, a shoe in the immediate vicinity of the surface covering element. The number of persons and the direction of movement thereof in a corresponding floor region can be determined by evaluating each sensor signal.

Identification methods with contactless labels are also known from the prior art. Examples of labels of this type are electronic passes or badges with integrated RFID transponders. Said transponders can be read by suitable RFID reading devices and passed on using data technology to a central unit for security checking with regard to access authorization.

BRIEF SUMMARY OF THE INVENTION

Proceeding from the aforementioned prior art, it is an object of the invention to provide a further developed method and a further developed system for evaluating the security situation in a building with accommodation areas with access authorization.

It is a further object of the invention to provide suitable uses of the method according to the invention and a radio station for a system of this type.

The object of the invention is achieved with the subject matter of the independent claims. Advantageous method variants and embodiments of the present invention are disclosed in the dependent claims.

According to the invention, a (mere) current count of the persons physically present in at least a partial region of the accommodation areas is determined in that, in a radio network which comprises a plurality of radio stations arranged spatially distributed in the ceiling, wall or floor region, the influencing of the radio field of said radio stations between one another by persons present there is evaluated, in particular by means of a variance-based radio tomography system. In each case, a current count of identifiers which are read by RFID reading devices of RFID transponders is determined, the identifiers being carried by authorized persons in compliance with regulations. The RFID reading devices are also arranged spatially distributed in the ceiling, wall or floor region. Based on the respective counts of personal identifiers and the currently determined person count, an indicator for evaluating the current security situation in the building is determined and output.

According to the invention, based on the radio stations arranged spatially distributed, the location or determination of the number of persons present is possible by means of a higher-level signal processing system arranged downstream and with evaluation of the received field strength of each radio station.

Herein the radio stations transmit one at a time in sequence whilst the remaining radio stations of the radio network switch to receive and then determine each radio field strength value. Then, at a higher level, the location determination takes place within the radio network by means of the radio tomographic method. Alternatively, in each case, one radio station can transmit on a different frequency channel, in particular a different frequency channel of the 2.45 GHz ISM frequency band, whilst the remaining other radio stations determine each radio field strength value for all of the frequency channels used for the radio tomographic method. Then, at a higher level, the location determination takes place again within the radio network by means of the radio tomographic method.

The simultaneous detection of the physical presence of persons and the identification thereof advantageously enables the presence of non-authorized persons or persons without a valid identifier and the location thereof in the building to be detected and tracked. Specific access barriers such as turnstiles, two-door entrances and the like are no longer required. Rather, by means of tracking, simultaneous detection of the presence of persons and possibly the identification thereof, the approach of a person not identified with the RFID transponder or of a person with an identifier recognized as being non-valid in an accommodation area with access authorization can be detected. In such a case, for example, security personnel can be ordered to this accommodation area with access authorization. The same is the case if an authorized person who has access authorization for a large part of the accommodation areas approaches an accommodation area with special access authorization for which said person has no valid identifier for access.

The accommodation areas with access authorization are, in particular, office rooms, research and development departments, connecting areas such as corridors, stairways and elevators, as well as entrances to or exits from the building. In principle no continuous areal monitoring or continuous tracking of the physical detection of the persons or continuous areal detection of the identifiers is necessary. For example, purely connecting areas, stairways or service rooms without additional entrances and exits can remain omitted. The same applies to accommodation areas which require no access authorization in general, such as foyers, canteens or waiting rooms. Thus, a building is made up patchwork-like from accommodation areas with access authorizations and accommodation areas without any access authorization requirement. It is also imaginable that, in the case of the accommodation areas with access authorization, only the identifiers are detected.

It is particularly advantageous if the accommodation areas without access authorization are at least partially monitored only for the presence of persons and possibly for the further movement thereof. In this way, a person having an associated valid identifier who is detected and tracked for physical presence through an accommodation area without access authorization with only monitoring for physical presence can be, so to speak, passed on to a further accommodation area with access authorization. Preferably, the number of all physically detectable persons is continuously determined at a higher level, for example, by the floor or section. The same applies for the continuous determination of the number of all contactlessly readable identifiers by the RFID transponders.

The concept of the security situation is taken to mean primarily the level of risk to businesses, public facilities and persons or groups of persons from unauthorized persons with the possible aim of gaining possession of confidential or secret documents, papers or electronic documents and data.

The detection of the "mere" current count of physically present persons is taken to mean only the detection of the integer count of persons. In particular, the method does not include any biometric method which enables or could enable conclusions to be drawn about the identity of each person.

RFID transponders are taken to mean, in particular, active and passive RFID transponders. Active RFID transponders emit an identifier (ID) which is electronically stored in each transponder, by emitting electromagnetic waves. Preferably, the active RFID transponders emit in an ISM frequency band, in particular, in the UHF frequency range, i.e. in the microwave range with frequencies in the range from 300 MHz to 3 GHz. Passive RFID transponders can be inductively coupled readable RFID transponders, for example, in the frequency range from 13.56 MHz, or passive UHF transponders which merely modulate the impedance of the transponder antenna with the identifier without themselves emitting electromagnetic waves.

RFID transponders can be integrated into a pass in chip card format, into a key, into a label, into a briefcase, into a bag, into a watch or the like.

The expression "indicator" is preferably taken to mean a numerical value whose size is a measure of the present, assessed security situation. The numerical value 0, for example, can denote the security situation "not endangered" or "safe" in a building. Rising numerical values can indicate a rising risk level of the security situation. The indicator can also be a changing color, for example, green for no danger, red for a high level of danger and yellow or orange for danger levels lying therebetween. The indicator can also be a series of symbols changing according to the danger level, for example, a danger sign or an "OK" symbol. The indicator can also be a series of letters or of different acoustic signals.

Typically, the location of a physically detected person and the location of an RFID transponder which is carried by the person and is read approximately match. Only in the case that the count of physically detected persons does not match the count of detected and read RFID transponders is a changed indication output, indicating a worsening of the security situation. This is the case, for example, if a person, for example, a visitor is not carrying an RFID transponder or is carrying an RFID transponder with a non-valid identifier. The same is the case if, for example, an RFID transponder is left behind. Here also, the count of physically detected persons does not match the count of identifiers detected. The change in this security situation can also be output with a changed indicator.

The indicator can be determined by a higher-level command center computer and, for example, output on a display, for example, by increasing a "danger value" or by changing the color of a security symbol from green (for no danger) to red (for danger present).

According to a variant of the method, a current total person count is determined at a higher level based on the influencing of the radio field by persons present, in a plurality of, in particular, overlapping radio networks. At a higher level, a current total identifier count is determined based on all the identifiers detected there. In this way, advantageously, a more extensive areal assessment of the security situation is made possible. Said more extensive assessment may be a plurality or all of the floors in a building and/or a plurality of associated buildings of a main building or building complex.

According to a further method variant, the difference between the two counts and/or between the two total counts is determined continuously as the indicator for the security situation. Possibly, a signal or a warning is output if the difference, in any case, exceeds a pre-determined comparison value.

The difference can take a positive or negative value, depending on whether the person count is greater or less than the count of the identifiers, wherein the case that the person counts is greater than the count of identifiers is to be seen as more critical with regard to security. In the simplest case, only the relevant difference is calculated.

The comparison value can be, for example, the numeral 0, 1, 2, or 3. The signal or warning can be, for example, an email or a text message, for example, an SMS or a pager notification. The relevant difference is a measure of the difference between the physically detected persons and the detected identifiers. As the deviation or difference increases, the indicator can have an increasing numerical value which represents an increasing worsening of the security situation. The difference between the current total person count and the current total identifier count gives an overview of the security situation which can certainly be different from a "local" difference of the current person count and the current identifier count in one of the accommodation areas.

According to a further method variant, the location of each physically present person in a radio network and/or the location of each read RFID transponder is determined and output. The output can be visualized, for example, on a graphically reproducible floor plan of the building. In this way, location discrepancies between the location of physically present persons and the location of each detected identifier can be recognized directly. Visual movements of persons detected and identified as being physically present, separated from the movements of detected identifiers are therefore an indication for the presence of a security infringement or for the presence of a worsening in the security situation. The same applies if visual movements of identifiers detected and identified as being detected are separated from the movements of detected physically present persons.

A further advantage is that, based on this location information, targeted evacuation of the building in the event of a fire alarm is possible. In other words, prioritized evacuation of accommodation areas having a high density of persons can be carried out by the rescue services called upon.

According to a variant of the method, at least part of the radio stations of a radio network simultaneously assumes the function of an RFID reading device. This significantly reduces the overall technical effort.

Preferably, each radio station is configured, in order to determine the count of persons physically present in the radio network, to transmit in a microwave frequency range, in particular, in a frequency range around 2.45 GHz. This frequency range is particularly suitable due to the high level of radio absorption by the human body.

According to a further variant of the method, each radio station is configured, for contactlessly reading RFID transponders, to transmit in a microwave frequency range, in particular, an ISM frequency range around 2.45 GHz, around 5.8 GHz, around 433 MHz, around 868 MHz or around 915 MHz.

Preferably, the frequency range is around 2.45 GHz, which is also a free ISM frequency band for RFID applications. Operation of the functions "RFID" and "radio tomography" can be carried out in time multiplex. It is also conceivable for the reading of each RFID transponder to be carried out in one of the many frequency channels of the ISM frequency band and for the radio tomography to be carried out in at least one of the other frequency channels.

According to a further advantageous variant of the method, at least part of the radio stations is simultaneously a WLAN radio station, configured for transmit and receive operation, particularly in the 2.45 GHz frequency band or in the 5 GHz frequency band. Thus, apart from the radio tomographic detection of the presence of persons and the reading of the RFID transponders carried by each person, simultaneous operation of a wireless radio data network is possible. The expression "WLAN" should be considered here to mean all, preferably standardized, radio data networks via which particularly mobile devices such as notebooks or smartphones can exchange data, for example, over the internet or an intranet.

Furthermore, according to an advantageous variant of the method, each WLAN radio station simultaneously has the function of a router for passing on radio data to at least one further WLAN radio station within radio range and/or to a further WLAN router situated within radio range.

The method according to the invention is advantageously usable for detecting and localizing persons having a missing or non-readable identifier. In this way, the security situation in a building is markedly improved.

The method according to the invention is also advantageously usable for detecting and localizing contactlessly read RFID transponders with non-valid identifiers. In this way also, the security situation in a building is markedly improved.

The object of the invention is further achieved with a radio station corresponding to the method according to the invention for operating in a radio network with further radio stations. The radio station is configured for transmitting and receiving radio signals. Said radio station has a first data interface for outputting a current received field strength value for the radio station. Said radio station is also configured for contactlessly reading out identifiers of RFID transponders located in the radio detection region of the radio station, in the manner of an RFID reading device. Finally, the radio station is configured for outputting at the first data interface the detected identifiers and/or the current count of identifiers.

Regardless of invention disclosed, the radio station can be configured to receive only, the radio station outputting a received field strength value to a radio-supported and/or cable-linked data interface. Preferably, the radio station is configured to receive in the microwave frequency range, in particular in the 2.45 GHz frequency band, for example, in the range from 2.4 GHz to 2.5 GHz. The received field strength value output at the data interface can then be used at a higher level to carry out a radio tomographic method as described above. The function of the radio station can be integrated into a danger alarm unit, for example, a fire or smoke detector. The radio station can be accommodated in a housing which resembles the shape of a fire or smoke detector. A radio station of this type or a fire or smoke detector of this type with the radio reception functionality described above can be configured to output, via a common interface, both the current received field strength value and fire or smoke detector data, for example, to a cable-connected fire alarm hub, via which the energy supply can also be provided. A radio station of this type or a fire or smoke detector of this type with the aforementioned radio reception functionality can also be configured to receive an identifier from actively transmitting RFID transponders and to output said identifiers, for example, together with the other data at the data interface. A radio station of this type can be realized as a movement detector or can be regarded as such.

The radio station can be a WLAN radio station and can have a second data interface for receiving and transmitting radio data and for outputting received radio data to the second data interface in the manner of a "WLAN hotspot". The second data interface can be connected to an internet network node or an intranet network node, for example, via an LAN data interface.

According to a further embodiment, the radio station has a third interface. The radio station also comprises a detection unit for detecting smoke, smoke particles or combustion gas particles and for outputting a detection value formed by the detection unit and/or a measurement variable derived therefrom as a measure of the concentration of detected smoke, smoke particle or combustion gas particles and/or to output an alarm or warning signal to the third data interface.

Finally, the object of the invention is solved by a corresponding system for evaluating the security situation in a building, the building having accommodation areas with access authorization for authorized persons. The system has a plurality of the aforementioned radio stations wherein said radio stations are part of a radio network. The system has a higher-level central unit which is connected for signal or data exchange with the radio stations. The central unit is configured, based on the identifiers received by each radio station, to determine a current count of identifiers, based on the field strength values received by each radio station, in particular by means of a radio tomographic location and detection method, to determine a current person count of persons physically present, to determine a current person count by means of a variance-based radio tomographic method and, based on these two counts, to determine and output an indicator for evaluating the current security situation in the building.

According to one embodiment of the system, the central unit is configured to determine continuously the difference between the two counts and, where appropriate, to output a signal as an indicator for the security situation if the difference exceeds a pre-determined comparison value.

According to a further embodiment, the central unit is configured to output a further signal if the count of identifiers recognized as being non-valid exceeds a further pre-determined comparison value.

According to a further embodiment, the central unit is configured to determine and output a location of each physically present person and/or the location of each read RFID transponder.

In a further embodiment, the system also has a danger signaling central unit linked to the radio stations for signal or data exchange, wherein the danger signaling central unit is configured for higher-level detection of the detection value and/or the alarm or warning signal derived therefrom which have been transmitted by each radio station with "fire alarm functionality". The higher-level central unit and the danger signaling central unit can constitute a common central unit as one component.

Finally, according to an advantageous embodiment, the system has a plurality of WLAN radio stations which constitute a WLAN radio network with a router function and wherein at least one of the WLAN radio stations is connected for data exchange to an internet and/or an intranet network.

BRIEF DESCRIPTION OF THE SEVERAL VIEWS OF THE DRAWING

The invention and advantageous embodiments of the present invention will now be described in greater detail by reference to the following figures, in which.

DESCRIPTION OF THE INVENTION

Figure 1:
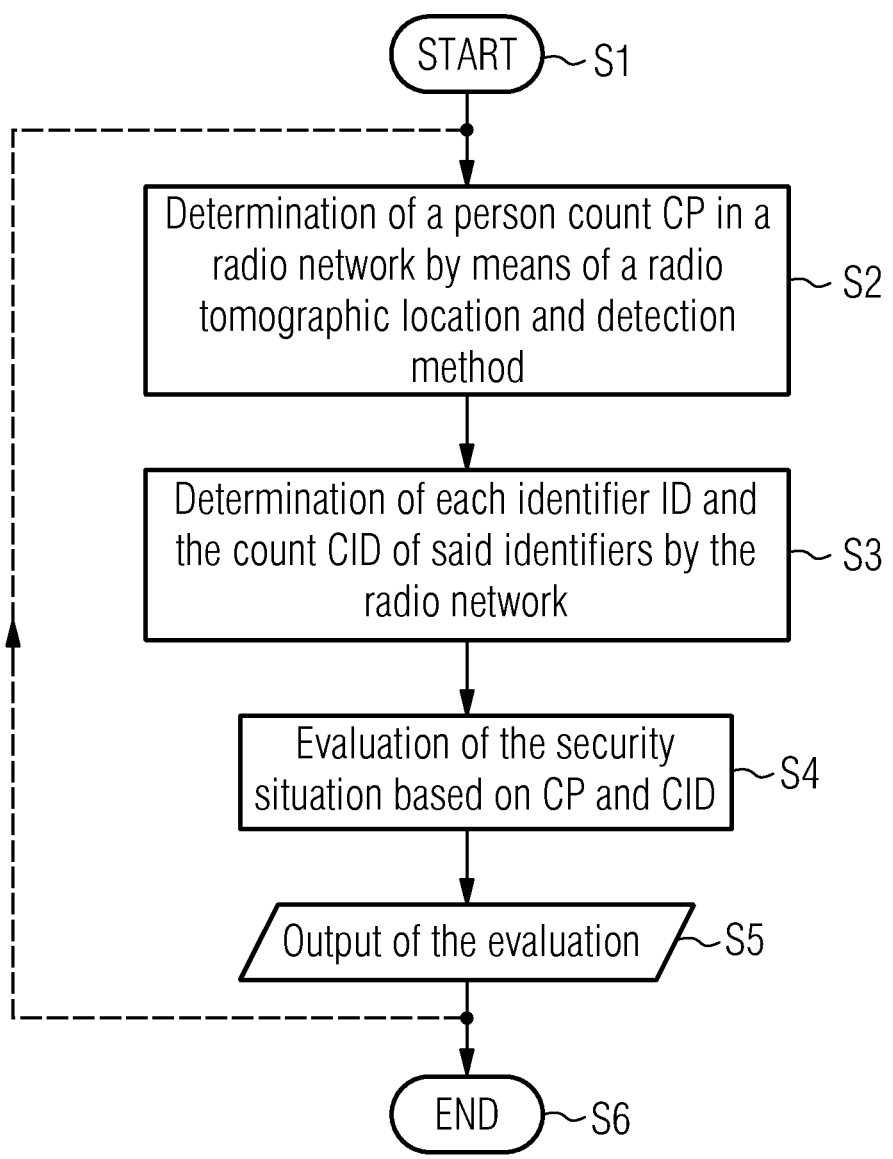
FIG. 1 is a flow diagram illustrating the principle of the method according to the invention.

FIG. 1 shows a flow diagram illustrating the principle of the method according to the invention.

The reference sign S1 indicates a start step for evaluating the security situation in a building wherein a building of this type has accommodation areas with access authorization for suitably authorized persons.

In step S2, by means of a radio tomographic location and detection method, the current count CP of physically present persons is automatically determined at least in a partial region of the accommodation areas.

In the subsequent step S3, the identifiers of RFID contactless transponders carried by each authorized person are automatically read in the at least one partial region. The current count CID of identifiers detected is determined.

In the last step S4, based on the two counts CP, CID, an indicator for evaluating the current security situation in the building is formed.

In step S5, the output of the evaluation determined takes place.

S6 is the end step of the method according to the invention.

For completeness, it should be noted that the sequence of the two method steps S2, S3 can also be reversed. The branch, shown dashed, leading back to step S2 is intended to illustrate that the steps S2 to S5 can be continuously repeated to be able to evaluate the security situation in a constantly updated manner.

Figure 2:
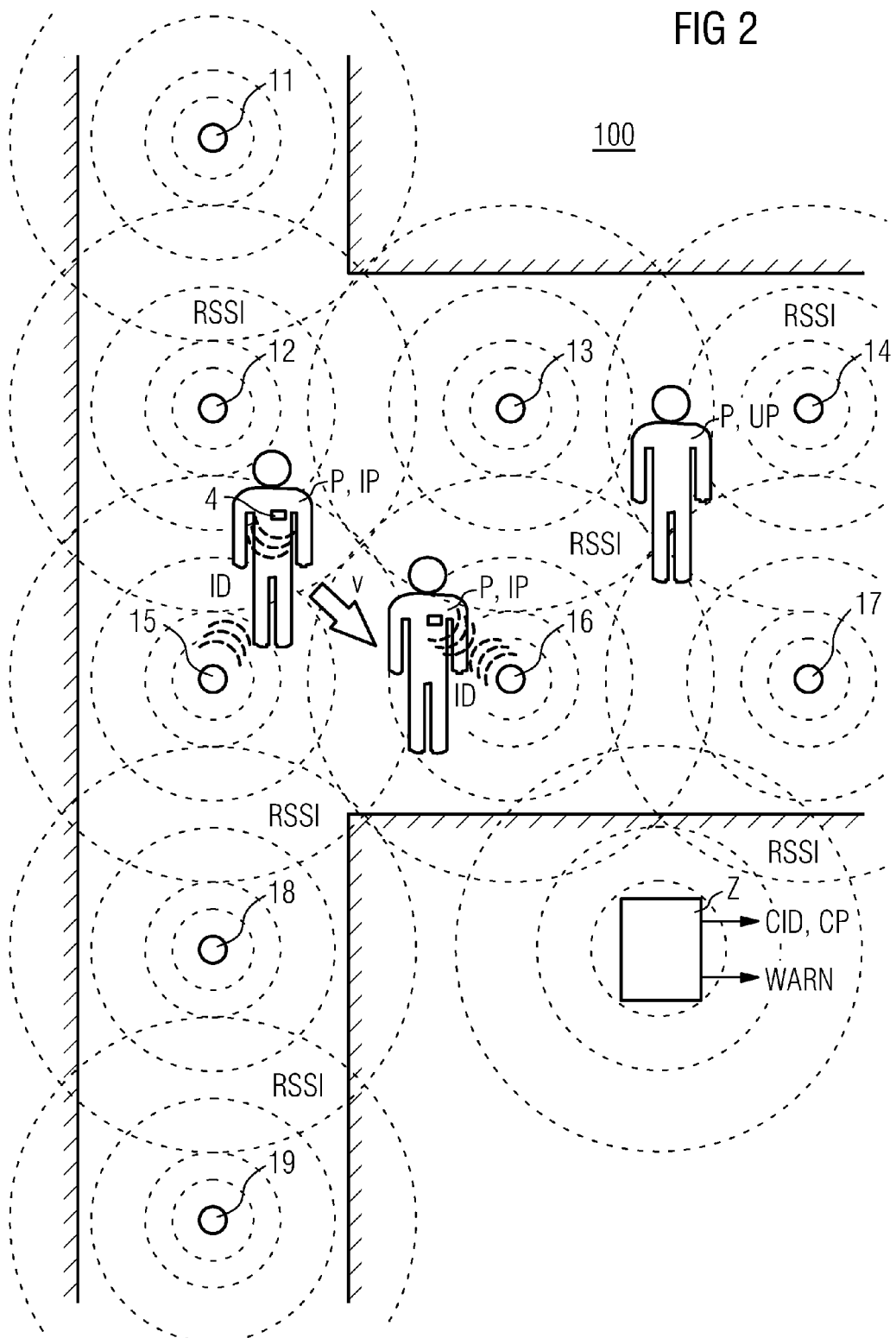
FIG. 2 is an example of the spatial arrangement of radio stations of a radio station network in a plan view of an accommodation area.

FIG. 2 shows an example of the spatial arrangement of radio stations 11-17 of a radio station network in a plan view of an accommodation area. The radio stations 11-17 shown do not have to be arranged distributed over the ceiling area as shown. Said radio stations can be arranged, for example, in the skirting board region or at "half" height along the building walls. The radio stations 11-17 can be connected via a common conductor-bound bus cable to a higher-level central unit Z. The radio stations, in turn, can alternatively or additionally be connected via radio to a radio-capable central unit Z as shown in FIG. 2. Each radio station 11-17 passes on data ID and RSSI originating from adjoining radio stations 11-17 arranged in a common overlapping radio region, as well as the data ID and RSSI that the radio stations themselves detect, via further radio stations 11-17 in the manner of a router to the central unit Z.

FIG. 2 shows how a person P in the illustration moves diagonally to the right and downwardly at a velocity v. He moves in the radio field emitted by the radio network and, with his body, influences said field by absorption, attenuation, diffraction and scattering effects. The influences on the radio field each find expression in a change of the received field strength at the radio stations 11-17. An indicator of the received field strength is provided, for example, by the RSSI (Received Signal Strength Indication) value known from WLAN technology which can take a value in the range from 0 to 255, where 255 represents the maximum possible received field strength. The influencing of the overall overlaid radio field is therefore a measure of the influence caused by persons located close to or between the transmitting radio station 11-17 and one or more receiving radio stations 11-17.

The velocity v at which the person P moves is also noticeable from a frequency shift in the received frequency at each radio station 11-17. The frequency shift is caused by the Doppler effect which leads to a phase shift produced by the moving person P and can also be evaluated by the central unit Z on evaluation of each received field strength RSSI. In this way, the movement direction and the velocity v can be calculated with a high degree of accuracy. The individual radio stations 11-17 can also be set up or configured, or can be controlled by the higher-level central unit Z such that said radio stations "themselves" determine the frequency shift and output a corresponding data value, such as a Δf, to the data interface thereof.

The radio stations 11-17 can be configured or can be controlled by the central unit Z such that, for example, one of the radio stations 11-17 always transmits whilst the other radio stations 11-17 switch to receive and transfer each received field strength RSSI to the central unit Z. A plurality, and in particular all, of the radio stations 11-17 can transmit cyclically whilst each of the other radio stations 11-17 switches to receive.

Furthermore, this person P carries a pass with an integrated RFID transponder 4 for possible identification by an RFID reading device. According to the invention, the radio stations 11-17, or at least part thereof, for example, every second or third spatially distributed radio station 11-17, are configured, in addition to determining a received field strength value RSSI, also to read an RFID transponder 4 present in the respective radio detection range. Said RFID transponder 4 is preferably a transponder 4 actively transmitting in the microwave range. Transponders 4 of this type can be integrated, for example, with a battery on a chip card. An identifier ID read from an RFID transponder 4 can be output at the data interface thereof and passed on to the central unit Z.

Due to the good absorption properties and influencing properties, for example, diffracting properties of the human body in the frequency range around 2.45 GHz, in particular in the region from 2.4 GHz to 2.5 GHz, and the position of said frequency band in a permitted free ISM frequency band, this frequency band is particularly well suited to the detection of physically present persons and the detection of the identifiers ID by means of the RFID transponder 4.

The higher-level central unit Z also has means for executing a computer program which is executed on a corresponding processor-supported processing unit.

This computer program has suitable program steps by means of which at a higher level, the transmitted field strength value RSSI of each radio station 11-17 can be detected. As described in the aforementioned publication "Radio-Based Monitoring Systems for Room Monitoring", by Professor Stefan Witte et al., Lemgo, Germany, by means of all the received radio field strengths RSSI, with suitable program steps of the computer program, an RSSI matrix can be created by calculation, on the basis of which the presence and count CP of the physically present persons P can be determined. Alternatively, or additionally, a movement direction of persons P toward and away from each radio station 11-17 can be determined from the respective changes over time of the received field strengths RSSI.

The computer program has further program steps in order to determine and possibly to output an overall identifier count CID from each received identifier ID, for example, on a screen.

In particular, the central unit Z is configured as an indicator for the current security situation to determine continuously the difference between the two counts CP, CID. The central unit Z can also be configured to output a signal WARN if the difference exceeds a pre-determined comparison value, such as the value 0. The signal WARN can also be transmitted as a warning signal, for example, to a mobile telephone of a security guard. The central unit can also output a further signal if the count of identifiers ID recognized as being non-valid exceeds a further pre-determined comparison value, for example, the value 0. Furthermore, the central unit Z and the higher-level central unit can be configured to determine the location of each physically present person P and/or the location of each RFID transponder 4 or identifier ID read and, for example, to visualize said locations on a floor plan of the building.

It is noted that the central unit Z described can also be configured as a radio station 11-17 within the meaning of the present application.

Figure 3:
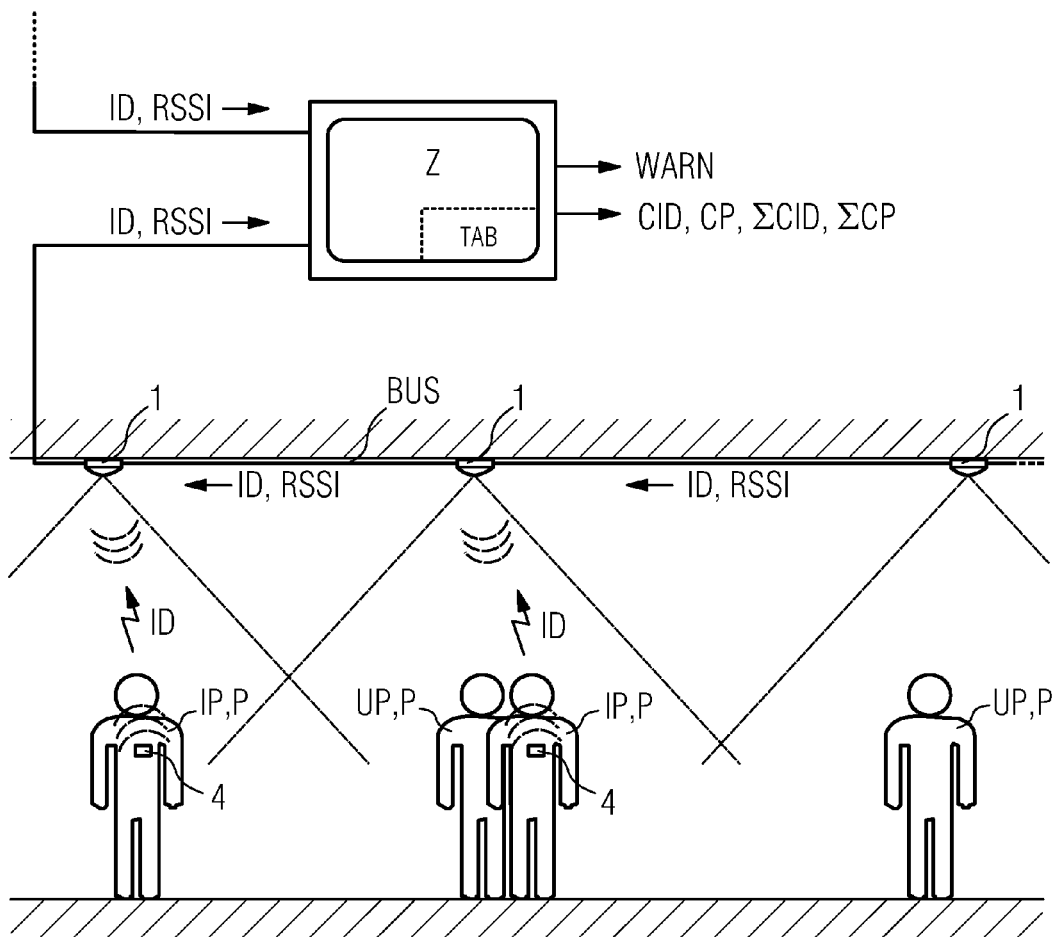
FIG. 3 is an example of a system according to the invention having a distributed arrangement of radio stations in the ceiling region.

FIG. 3 shows an example of a system according to the invention having a distributed linear arrangement of radio stations 1 in the ceiling region. In the upper part of FIG. 3, a central unit Z is shown which, in addition to the lower "message line", is connected for data exchange to a further message line for detecting identifiers ID and further received field strength values RSSI from another accommodation area to be monitored, for example, in another part of a building. The central unit Z is configured to determine both the respective current count CP of physically present persons P in the transmitting and receiving region of the radio stations 1 shown in the lower part of FIG. 3, based on the respective received field strengths RSSI or to determine the received levels and a further current count CP based on received field strengths RSSI which arise from the other accommodation area (not shown). In the present case, a table which contains all the current RSSI values from all the radio stations 1 is identified as TAB. Based on this table TAB, a suitable computer program can carry out the location and detection of persons by means of a radio tomographic method.

Furthermore, the central unit Z is configured to determine and output a total person count ΣCP and a total identifier count ΣCID from the respective person counts CP and the respective identifier counts CID. In the example shown in FIG. 3, a person count CP of 4 and a count CID for the identifiers ID of 2 is determined for the lower accommodation area. In this case, a warning WARN is output since the difference between the two counts CP, CID as an indicator for a changed security situation in the building exceeds a pre-determined comparison value of, for example, zero.

Figure 4:
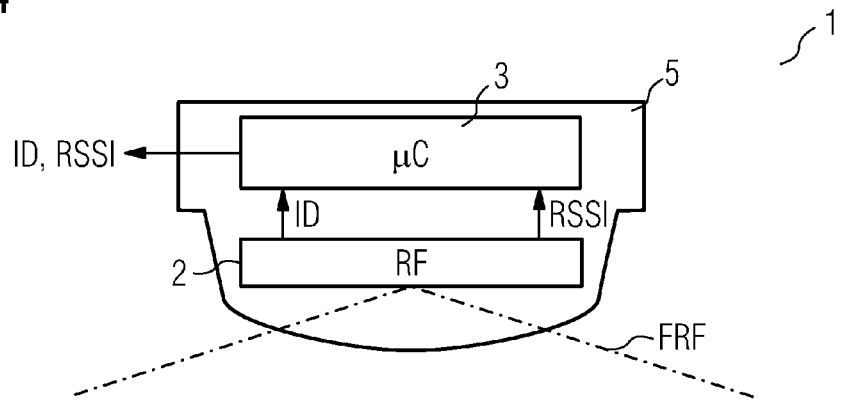
FIG. 4 is an illustration of the structure of an exemplary radio station of FIG. 3 in the function as an RFID reading device and as part of a location and detection system for persons based on the influencing of radio fields.

FIG. 4 is an illustration of the structure of an exemplary radio station 1 in the function thereof as an RFID reading device and as part of a location and detection system for persons P based on the influencing of radio fields.

The reference sign 2 indicates a radio module, in particular a radio transmitting/receiving unit which is configured to detect identifiers ID and for outputting a currently determined received field strength value RSSI. The radio transmitting/receiving unit 2 is preferably configured for operation in the microwave range, in particular, the 2.4 GHz to 2.5 GHz frequency band. The identifier ID received and the current received field strength value RSSI are passed on to a processing unit 3, for example, a microprocessor connected thereto. Based on a suitable software program which is executed on the microcontroller 3, the two data ID, RSSI are passed on to a higher-level central unit Z for further processing. The radio detection range of the radio module 2 is identified as FRF. A housing which is transparent to microwaves and in which the components 2, 3 of the radio station 1 are accommodated is identified as 5. The housing 5 resembles the form of conventional fire or smoke detectors.

Figure 5:
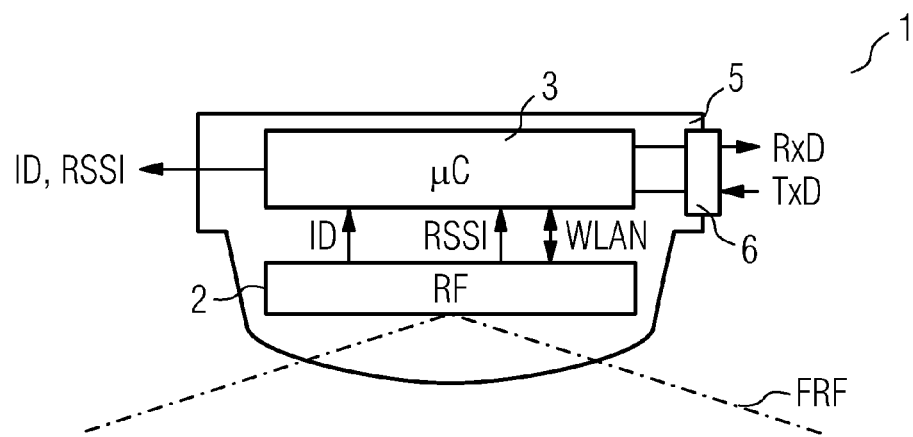
FIG. 5 is an illustration of the structure of an exemplary radio station according to the invention in a second embodiment.

FIG. 5 is an illustration of the structure of an exemplary radio station 1 according to the invention in a second embodiment.

Compared with the previous embodiment, the radio station 1 is additionally configured as a WLAN radio station 1. The transmitted and received data are identified as WLAN. The reference sign 6 is used to identify a data interface, in particular an LAN interface for connecting the radio station 1 to a network node. The network node is typically an internet and/or intranet network node. In the present example, the processing unit 3 takes on the management of the data traffic from the network node to the radio mxxxxxxxxxxxxxxxxxxxxxxxxxxx odule 2 and vice versa for the transmitted and received data WLAN. Reading data which are output at the network node and can originate from a WLAN subscriber (not shown in detail) present in the radio detection range FRF are identified as RxD. TxD denotes transmitting data which originate from the network node and can be output via the radio module 2 to the WLAN subscriber. Data communication via the WLAN preferably takes place in the 2.4 GHz to 2.5 GHz frequency band or in the 5 GHz frequency band.

Figure 6:
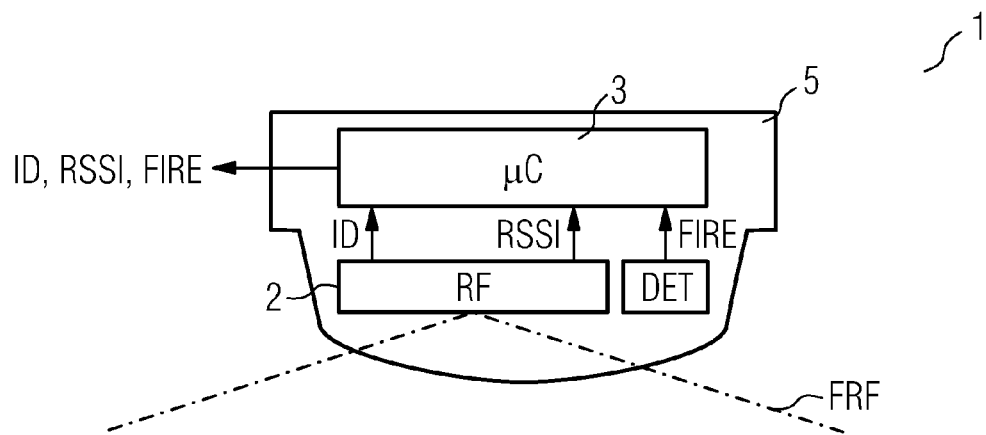
FIG. 6 is an illustration of the structure of an exemplary radio station according to the invention in a third embodiment.

FIG. 6 is an illustration of the structure of an exemplary radio station 1 according to the invention in a third embodiment. Compared with the previous embodiment, the radio station 1 additionally comprises a detection unit DET for detecting smoke, smoke particles or combustion gas particles. Preferably, the housing of a radio station 1 of this type is the housing of a known fire or smoke detector which already has the housing openings required for fire and smoke detection. The detection unit DET emits, as in the present example, an alarm or warning signal FIRE to the processing unit 3 in the case of a fire being detected. The processing unit 3 can output this event, for example, via the radio module 2 to a danger signaling central unit or to a fire alarm bus (not shown in detail) which is connected thereto.

For the sake of completeness, it is noted that the radio station 1 can naturally also be a combination of both the embodiments of FIG. 5 and FIG. 6. A radio station 1 of this type is both part of a location and detection system based on the influencing of radio fields as well as an RFID reading device, a WLAN radio station or WLAN router and a fire or smoke detector in one.

REFERENCE SIGNS

1, 11-19 Radio station, WLAN radio station
2 Radio module, radio transmitting/receiving unit, WLAN module
3 Electronic processing unit, microcontroller
4 Pass with RFID transponder, badge
5 Housing
100 Building
BUS Information bus, data bus, signal bus, fire alarm bus
CID Identifier count
CP Person count
DET Detector, smoke detector, fire detector, gas detector
FIRE Detector signal
FRF Radio detection range
ID Identifier
IP Authorized person
P Person
RSSI Radio field strength signal
S1-S6 Method steps
UP Unauthorized person
WARN Warning signal
TAB Table, RSSI matrix
v Velocity
Z Central unit
ΣCID Total identifier count
ΣCP Total person count

The invention claimed is:

1. A method for evaluating a security situation in a building, the building having accommodation areas with access authorization for authorized persons, which comprises the steps of:
   determining a first current count of persons physically present in at least a partial region of the accommodation areas via a radio network containing a plurality of radio stations disposed spatially distributed in a ceiling, wall or floor region, an influencing of a radio field of the radio stations between one another by the persons physically present there is evaluated, the plurality of radio stations configured to transmit in a microwave frequency range selected for a high radio absorption by human bodies;
   determining in each case, a second current count of identifiers, read by radio frequency identification (RFID) reading devices, of RFID transponders, the identifiers being carried by the authorized persons in compliance with regulations and the RFID reading devices also being disposed there spatially distributed in the ceiling, wall or floor region; and
   determining and outputting an indicator for evaluating a current security situation in the building, based on the second current count of the identifiers and the first current count the persons;
   determining a current total person count at a higher level based on influencing of the radio field by the persons present, in a plurality of overlapping radio networks; and
   determining a current total identifier count at a higher level based on all the identifiers detectable there;
   performing at least one of:
      determining a difference between the first and second current counts continuously as the indicator for the current security situation;
      determining a difference between the current total person count and the current total identifier count continuously as the indicator for the current security situation; and
      outputting a signal if the difference in any case exceeds a pre-determined comparison value; and
   outputting a further signal if the second current count of the identifiers is recognized as being non-valid and exceeds a pre-determined further comparison value.

2. The method according to claim 1, which further comprises determining and outputting at least one of a location of each physically present person in the radio network or a location of each read RFID transponder.

3. The method according to claim 1, wherein at least part of the radio stations of the radio network simultaneously assumes a function of an RFID reading device.

4. The method according to claim 3, wherein each of the radio stations is configured, in order to determine the first current count of the persons physically present in the radio network, to transmit in a microwave frequency range.

5. The method according to claim 3, which further comprises configuring each of the radio stations for contactlessly reading of the RFID transponders and to transmit in a microwave frequency range.

6. The method according to claim 1, wherein at least part of the radio stations is simultaneously a wireless local area network (WLAN) radio station, configured for transmit and receive operation.

7. The method according to claim 6, wherein the WLAN radio station simultaneously has a function of a router for passing on radio data to at least one further WLAN radio station within radio range and/or to a further WLAN router situated within the radio range.

8. The method according to claim 1, which further comprises determining the first current count of the persons physically present by means of a radio tomographic location and detection method.

9. The method according to claim 1, wherein at least part of the radio stations is simultaneously a wireless local area network radio station, configured for transmit and receive operation, in the 2.4 GHz frequency band or in the 5 GHz frequency band.

10. The method according to claim 1, which further comprises detecting and locating persons with missing, non-readable or non-valid identifiers.

11. A radio station for operating in a radio network with further radio stations, the radio station configured for receiving and transmitting radio signals, the radio station comprising:
   a first data interface for outputting a current received field strength value of the radio station, the radio station configured for contactlessly reading out identifiers from radio frequency identification transponders located in a radio detection region of the radio station, in a manner of an RFID reading device, and the radio station being configured for outputting at said first data interface detected identifiers and/or a current count of the identifiers, the radio station configured to transmit in a microwave frequency range selected for a high radio absorption by human bodies, wherein the radio station is a wireless local area network (WLAN) radio station;
   the WLAN radio station containing a second data interface for receiving radio data to be transmitted and for outputting received radio data at said second data interface;
   a third data interface; and
   a detection unit for detecting smoke, smoke particles or combustion gas particles and for outputting a detection value formed by said detection unit and/or a measurement variable derived there from as a measure of a concentration of detected smoke, fire or combustion gas particles and/or to output an alarm or warning signal derived there from to said third data interface, and the radio station is configured to output the detection value and/or the measurement variable derived there from as a measure of the concentration of the detected smoke, the fire or the combustion gas particles and/or to output the alarm or warning signal derived there from to said third data interface.

12. A system for evaluating a security situation in a building, the building having accommodation areas with access authorization for authorized persons, the system comprising:
   a radio network having a plurality of radio stations receiving and transmitting radio signals, each of said radio stations having a first data interface for outputting a current received field strength value of said radio station, said radio stations configured for contactlessly reading out identifiers from radio frequency identification transponders located in a radio detection region of said radio station, in a manner of an RFID reading device, and said radio stations configured for outputting at said first data interface detected identifiers and/or a current count of the identifiers, said plurality of radio stations configured to transmit in a microwave frequency range selected for a high radio absorption by human bodies; and
   a higher-level central unit connected for signal or data exchange with said radio stations, said higher-level central unit configured, based on the identifiers received by each of said radio stations, to determine the current count of the identifiers, and based on the current received field strength values received by each of said radio stations to determine a current person count of persons physically present and, based on the current person count and the current count of the identifiers to determine and output an indicator for evaluating a current security situation in the building;
   said central unit determining continuously a difference between the current person count and the current count of the identifiers as the indicator for the current security situation and, where appropriate, to output a signal if the difference in any case exceeds a pre-determined comparison value; and
   said central unit configured to output a further signal if the current count of the identifiers recognized as being non-valid exceeds a further pre-determined comparison value.

13. The system according to claim 12, wherein said central unit is configured to determine and output a location of each physically present person and/or a location of each read RFID transponder.

14. The system according to claim 12, further comprising a danger signaling central unit configured for higher-level detection of a detection value and/or an alarm or warning signal derived there from which have been transmitted by each of said radio stations.

15. The system according to claim 14, wherein said higher-level central unit and said danger signaling central unit constitute a common central unit as one component.

16. The system according to claim 12, wherein said radio stations are wireless local area network radio stations and each contain a second data interface for receiving radio data to be transmitted and for outputting received radio data at said second data interface, said WLAN radio stations constitute a WLAN radio network with a router function and wherein at least one of said WLAN radio stations is connected for data exchange to an Internet and/or an intranet network node.

17. A system for evaluating a security situation in a building, the building having accommodation areas with access authorization for authorized persons, the system comprising:
   a radio network having a plurality of radio stations receiving and transmitting radio signals, each of said radio stations having a first data interface for outputting a current received field strength value of said radio station, said radio stations configured for contactlessly reading out identifiers from radio frequency identification transponders located in a radio detection region of said radio station, in a manner of an RFID reading device, and said radio stations configured for outputting at said first data interface detected identifiers and/or a current count of the identifiers, said plurality of radio stations configured to transmit in a microwave frequency range selected for a high radio absorption by human bodies; and
   a higher-level central unit connected for signal or data exchange with said radio stations, said higher-level central unit configured, based on the identifiers received by each of said radio stations, to determine the current count of the identifiers, and based on the current received field strength values received by each of said radio stations to determine a current person count of persons physically present and, based on the current person count and the current count of the identifiers to determine and output an indicator for evaluating a current security situation in the building; and wherein said higher-level central unit uses a radio tomographic location and detection method to determine the current person count of the persons physically present.

18. The method of claim 1, wherein the microwave frequency range is in a region from 2.45 GHz to 2.5 GHz.

* * * * *